United States Patent
Oh et al.

(10) Patent No.: US 10,401,684 B2
(45) Date of Patent: Sep. 3, 2019

(54) LIQUID CRYSTAL DISPLAY DEVICE

(71) Applicant: Samsung Display Co. Ltd., Yongin (KR)

(72) Inventors: Ik Han Oh, Cheonan-si (KR); Wan Namgung, Asan-si (KR); Seung Kyu Lee, Cheonan-si (KR); Ho Jun Lee, Asan-si (KR); Youn Hak Jeong, Cheonan-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 164 days.

(21) Appl. No.: 15/137,854

(22) Filed: Apr. 25, 2016

(65) Prior Publication Data

US 2017/0090253 A1  Mar. 30, 2017

(30) Foreign Application Priority Data

Sep. 25, 2015  (KR) .......................... 10-2015-0136117

(51) Int. Cl.
  *G02F 1/1337*  (2006.01)
  *G02F 1/1343*  (2006.01)
  *G02F 1/1362*  (2006.01)

(52) U.S. Cl.
  CPC .. *G02F 1/133707* (2013.01); *G02F 1/134309* (2013.01); *G02F 1/136286* (2013.01); *G02F 2001/133757* (2013.01); *G02F 2001/133776* (2013.01); *G02F 2001/134318* (2013.01)

(58) Field of Classification Search
  CPC ... G02F 1/133707; G02F 2001/134318; G02F 1/136286; G02F 2001/133757; G02F 1/133776
  See application file for complete search history.

(56) References Cited

U.S. PATENT DOCUMENTS

| 2012/0281173 A1* | 11/2012 | Kwon ............... G02F 1/133707 349/123 |
| 2013/0201432 A1* | 8/2013 | Yun .................. G02F 1/134309 349/123 |
| 2014/0267994 A1* | 9/2014 | Ryu ................. G02F 1/133707 349/141 |

FOREIGN PATENT DOCUMENTS

KR  1020150019131  2/2015

* cited by examiner

*Primary Examiner* — Jessica M Merlin
(74) *Attorney, Agent, or Firm* — Cantor Colburn LLP

(57) ABSTRACT

A liquid crystal display device includes first and second substrates facing each other and including pixels, a pixel electrode disposed on the first substrate to be provided in each of the pixels, and a common electrode disposed on the second substrate, where the pixel electrode includes first unit electrodes, each of the first unit electrodes includes four domains, which are arranged in two rows in a first direction and two columns in a second direction, the four domains include first, second, third, and fourth domains of a corresponding first unit electrode, each of the first unit electrodes further includes a first slit, which is an opening defined along boundaries between the first through fourth domains, and the common electrode includes second slits, which are openings defined along outer sides of each of the first unit electrodes.

16 Claims, 13 Drawing Sheets

LIQUID CRYSTAL DISPLAY DEVICE

This application claims priority to Korean Patent Application No. 10-2015-0136117 filed on Sep. 25, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device.

2. Description of the Related Art

A liquid crystal display ("LCD") devices has a wide variety of applications, such as mobile phones, notebook computers, monitors, air crafts, and space crafts due to its numerous advantages such as low operation voltage, low power consumption, portability, and the like.

In general, an LCD device includes an array substrate, which displays an image using the optical transmittance of liquid crystal molecules, an opposite substrate which faces the array substrate, and a light assembly which provides light to the array substrate and the opposite substrate. The LCD device also includes pixels, which may render different colors, and may display arbitrary colors using combinations of the colors rendered by the pixels. The pixels may display red ("R"), green ("G"), and blue ("B") colors, for example, and various colors may be displayed using combinations of the R, G, B colors.

Pixel electrodes are provided in the pixels, respectively, and a common electrode is provided to face the pixel electrodes. The transmittance of the LCD device varies depending on the structures of the pixel electrodes and the common electrode. Accordingly, a pixel electrode structure and a common electrode structure improving the transmittance of the LCD device are desired.

SUMMARY

Exemplary embodiments of the invention provide a liquid crystal display ("LCD") device having a pixel electrode structure and a common electrode structure improving transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, an LCD device includes first and second substrates facing each other and including a plurality of pixels, a liquid crystal layer interposed between the first and second substrates and including a plurality of liquid crystal molecules, a pixel electrode disposed on the first substrate to be provided in each of the pixels, and a common electrode disposed on the second substrate, where the pixel electrode includes a plurality of first unit electrodes, each of the first unit electrodes includes four domains, which are arranged in two rows in a first direction and two columns in a second direction that intersects the first direction, the four domains include first, second, third, and fourth domains, which are on an upper left side, an upper right side, a lower left side, and a lower right side, respectively, of a corresponding first unit electrode, a first slit, which is an opening defined along boundaries between the first through fourth domains, is defined in each of the first unit electrodes, and second slits, which are openings defined along outer sides of each of the first unit electrodes, are defined in the common electrode.

According to another exemplary embodiment of the invention, a display device includes first and second substrates facing each other and including a plurality of pixels, a liquid crystal layer interposed between the first and second substrates and including a plurality of liquid crystal molecules, a pixel electrode disposed on the first substrate to be provided in each of the pixels, and a common electrode disposed on the second substrate, where the pixel electrode includes a plurality of first unit electrodes, each of the first unit electrodes includes four domains which are arranged in two rows in a first direction and two columns in a second direction that intersects the first direction, the four domains include first, second, third, and fourth domains, which are on an upper left side, an upper right side, a lower left side, and a lower right side, respectively, of a corresponding first unit electrode, liquid crystal molecules overlapping the first domain are controlled to be tilted in an upper left direction, liquid crystal molecules overlapping the second domain are controlled to be tilted in an upper right direction, liquid crystal molecules overlapping the third domain are controlled to be tilted in a lower left direction, and liquid crystal molecules overlapping the first domain are controlled to be tilted in a lower right direction.

According to the exemplary embodiments, an LCD device having a pixel electrode structure and a common electrode structure improving transmittance may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
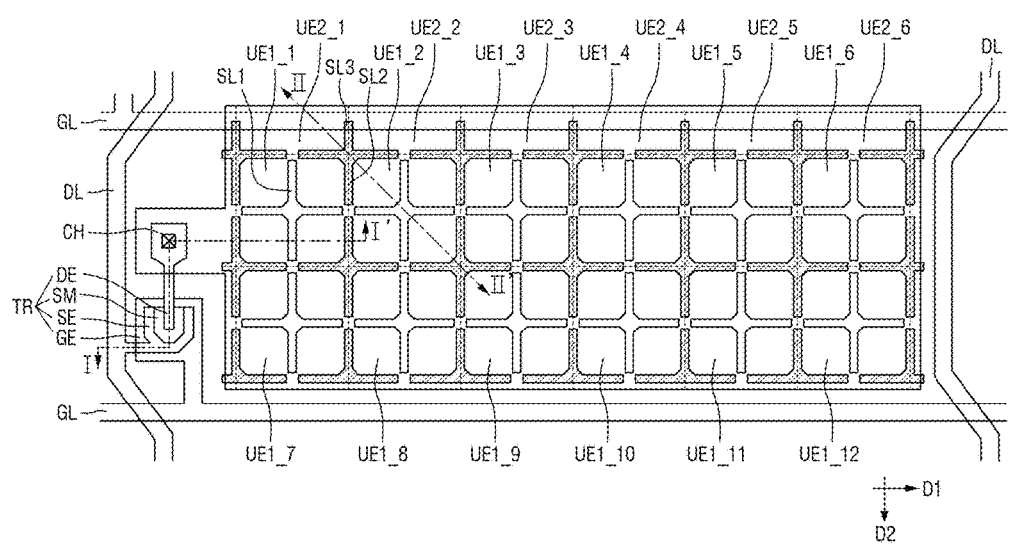
FIG. 1 is a plan view of an exemplary embodiment of a pixel of a liquid crystal display ("LCD") device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
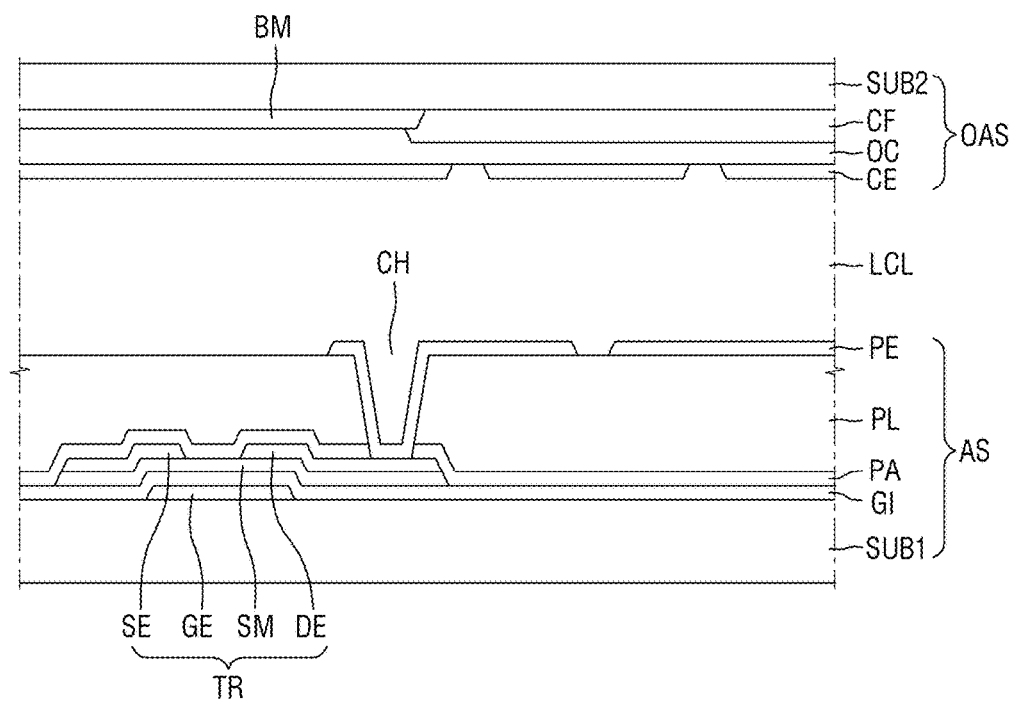
FIG. 2 is a cross-sectional view taken along line I-I' of FIG. 1.
Figure 3:
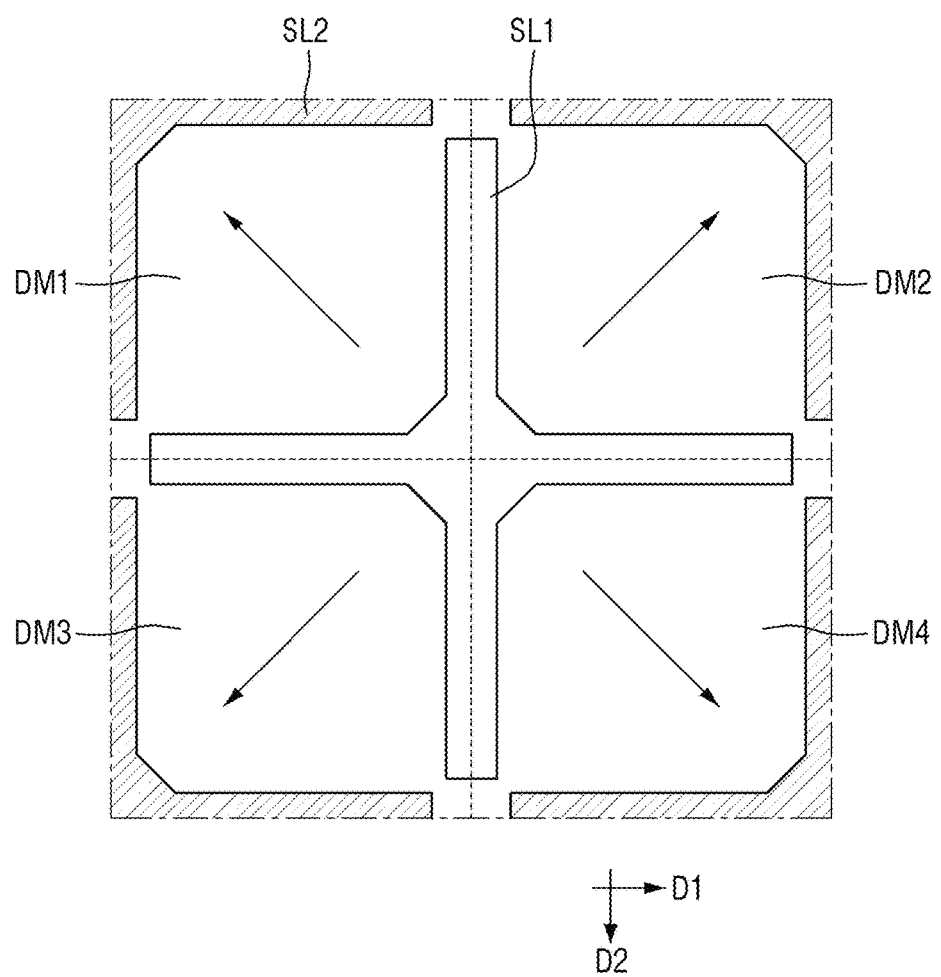
FIG. 3 is an enlarged plan view of an exemplary embodiment of a first unit electrode of the exemplary embodiment of the LCD device of FIG. 1.
Figure 4:
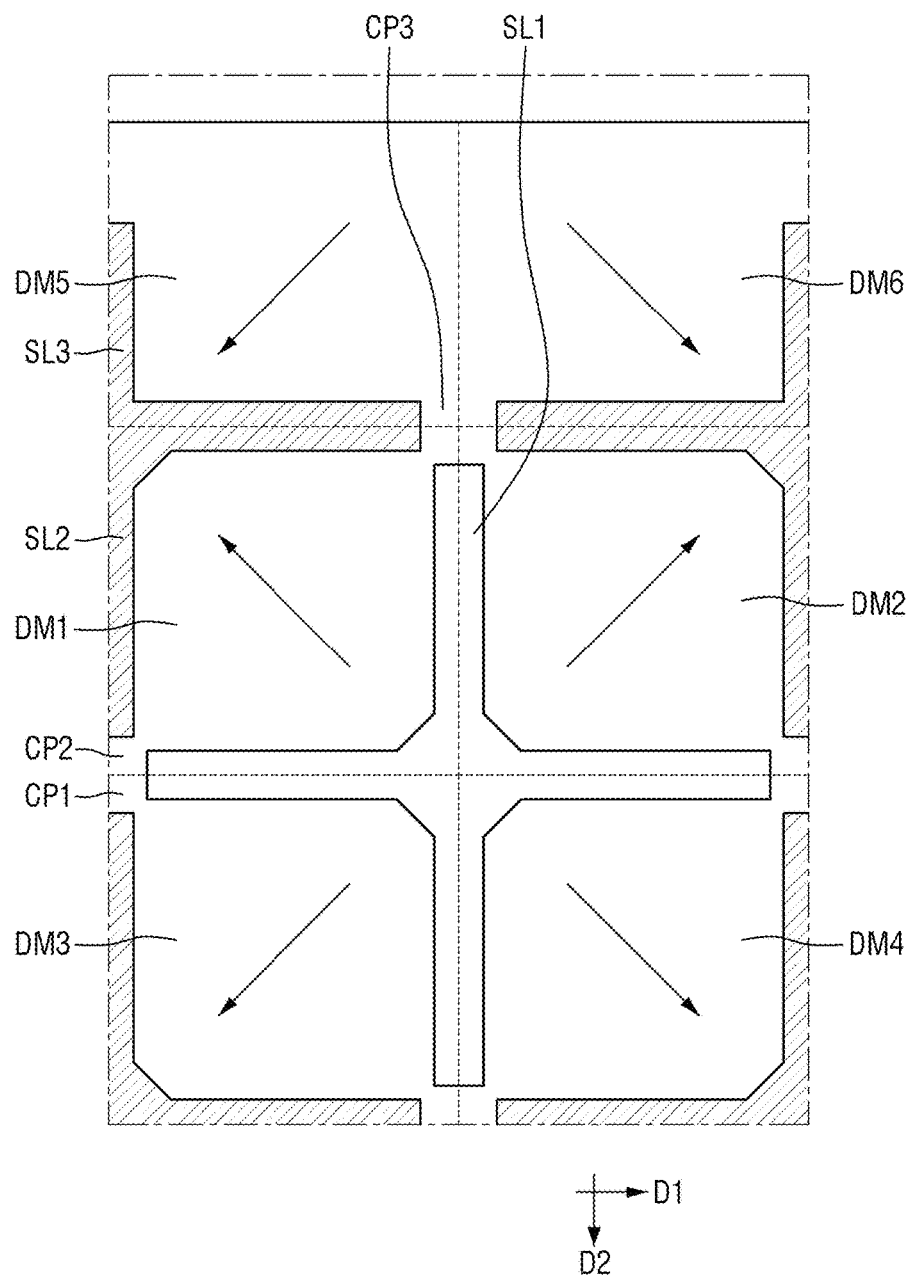
FIG. 4 is an enlarged plan view of an exemplary embodiment of a first unit electrode and a second unit electrode of the exemplary embodiment of the LCD device of FIG. 1.

FIG. 1 is a plan view of a pixel of a liquid crystal display ("LCD") device according to an exemplary embodiment of the invention, FIG. 2 is a cross-sectional view taken along line I-I' of FIG. 1, FIG. 3 is a cross-sectional view taken along line II-IF of FIG. 1, and FIG. 4 is a plan view of area A of FIG. 1.

Referring to FIGS. 1 to 4, the LCD device according to the exemplary embodiment includes an array substrate AS, an opposite substrate OAS, and a liquid crystal layer LCL.

The array substrate AS is a thin-film transistor ("TFT") array substrate on which TFTs TR for driving liquid crystal molecules LC (refer to FIG. 5) in the liquid crystal layer LCL are disposed, and the opposite substrate OAS may be a substrate facing the array substrate AS.

The array substrate AS will hereinafter be described.

The array substrate AS includes a first base substrate SUB1. The first substrate SUB1 may be a transparent insulating substrate. In an exemplary embodiment, the first base substrate SUB1 may be a glass substrate, a quartz substrate, a transparent resin substrate, or the like, for example. The first base substrate SUB1 may include a polymer or plastic material with high thermal resistance. The first base substrate SUB1 may be in the shape of a flat plate, for example, but may be curved in a particular direction. In an exemplary embodiment, the first base substrate SUB1 may be in a rectangular shape with four sides in a plan view, for example, but is not limited thereto, and may be in a polygonal or circular shape or may have some curved sides.

The first base substrate SUB1 may be a flexible substrate. That is, the first base substrate SUB1 may be deformable through rolling, folding or bending.

Gate wiring which includes a gate line GL and a gate electrode GE is disposed on the first base substrate SUB1. The gate line GL transmits a gate signal and may extend in a first direction D1.

In an exemplary embodiment, the gate wiring including the gate line GL and the gate electrode GE may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti), or the like. In an exemplary embodiment, the gate wiring including the gate line GL and the gate electrode GE may have a single-layer structure or may have a multilayer structure including two conductive films having different physical properties, where one of the two conductive films may include a low-resistance metal, for example, an Al-based metal, an Ag-based metal, a Cu-based metal, or the like, so as to reduce signal delays or voltage drops in the gate wiring including the gate line GL and the gate electrode GE, and another conductive film may include a material with excellent contact properties with respect to indium tin oxide ("ITO") and indium zinc oxide ("IZO"), such as a Mo-based metal, Cr, Ti, Ta, or the like. Examples of the multilayer structure of the gate wiring including the gate line GL and the gate electrode GE include the combination of a Cr lower film and an Al upper film and the combination of an Al lower film and a Mo upper film, but the invention is not limited thereto. That is, the gate wiring including the gate line GL and the gate electrode GE may be provided using various metals and conductors other than those set forth herein.

The gate electrode GE may be provided to protrude from the gate line GL.

A gate insulating layer GI is disposed on the gate wiring including the gate line GL and the gate electrode GE. The gate insulating layer GI may include an insulating material. In an exemplary embodiment, the gate insulating layer GI may include silicon nitride, silicon oxide, silicon oxynitride, or a high dielectric constant material, for example. The gate insulating layer GI may have a single-layer structure or may have a multilayer structure including two insulating films having different physical properties.

A semiconductor layer SM is disposed on the gate insulating layer GI. The semiconductor layer SM may at least partially overlap the gate electrode GE. In an exemplary embodiment, the semiconductor layer SM may include amorphous silicon, polycrystalline silicon, or an oxide semiconductor, for example.

Although not specifically illustrated, an ohmic contact member may be further provided on the semiconductor layer SM. In an exemplary embodiment, the ohmic contact member may include n+ hydrogenated amorphous silicon doped with a high concentration of n-type impurities, or silicide, for example. The ohmic contact member may be disposed on the semiconductor layer SM, being paired with another ohmic contact member. In response to the semiconductor layer SM including an oxide semiconductor, the ohmic contact member may not be provided.

Data wiring including a data line DL and a source electrode SE is disposed on the semiconductor layer SM and the gate insulating layer GI. The data wiring may include at least one data line DL and a source electrode SE.

The data line DL transmits a data signal. The data line DL may extend in a second direction D2, which intersects the first direction D1, and thus may intersect the gate line GL.

The source electrode SE may be branched off, and protrude, from the data line DL, and the drain electrode DE may be spaced from the source electrode SE. The source electrode SE and the drain electrode DE may partially overlap or contact the semiconductor layer SM or may face each other with the semiconductor layer SM disposed therebetween. At least one of the source electrode SE and the drain electrode DE may at least partially overlap the gate electrode GE, but the invention is not limited thereto.

In an exemplary embodiment, the data wiring including the data line DL and the source electrode SE may include Al, Cu, Ag, Mo, Cr, Ti, Ta or an alloy thereof, for example. The data wiring including the data line DL and the source electrode SE may have a multilayer structure including a lower film including a refractory metal and a low-resistance upper film disposed on the lower film, but the invention is not limited thereto.

The gate electrode GE, the source electrode SE, and the drain electrode DE may provide a TFT TR together with the semiconductor layer SM, and the channel of the TFT TR may be defined in the semiconductor layer SM between the source electrode SE and the drain electrode DE. The TFT TR may be electrically connected to the gate line GL and the data line DL.

A passivation layer PA is disposed on the gate insulating layer GI and the TFT TR. The passivation layer PA may include an inorganic insulating material and may cover the TFT TR.

A planarization layer PL is disposed on the color filter CF. The planarization layer PL may planarize the top of the passivation layer PA and may include an organic material. In an exemplary embodiment, the planarization layer PL may include a photosensitive organic material, for example.

A contact hole CH, which exposes part of the TFT TR, and particularly, part of the drain electrode DE, is defined through the planarization layer PL and the passivation layer PA. The contact hole CTN may serve as a pathway that physically connects the drain electrode DE disposed below the passivation layer PA and elements disposed on the planarization layer PL.

A pixel electrode PE is disposed on the planarization layer PL. Part of the pixel electrode PE is physically connected to the drain electrode DE via the contact hole CH and may receive a voltage from the drain electrode DE. In an exemplary embodiment, the pixel electrode PE may include a transparent conductive material such as ITO, IZO, indium tin zinc oxide ("ITZO"), aluminum-doped zinc oxide ("AZO"), or the like.

The pixel electrode PE may be disposed in each pixel. The pixel electrode PE may include a plurality of first unit electrodes UE1_1 through UE1_12, which will hereinafter be collectively referred to as the first unit electrodes UE1, and a plurality of second unit electrodes UE2_1 through UE2_6, which will hereinafter be collectively referred to as the second unit electrodes UE2. In an exemplary embodiment, the pixel electrode may include a transparent conductive material such as ITO, IZO, ITZO, AZO, or the like.

The first unit electrodes UE1 may be physically connected to one another, may receive the same voltage, and may have the same shape. In the illustrated exemplary embodiment, the pixel electrode PE may include a total of twelve first unit electrodes UE1, which are arranged in two rows in the first direction D1 and six columns in the second direction D2. However, the invention is not limited to the illustrated exemplary embodiment. That is, the pixel electrode PE may include more than twelve first unit electrodes UE1 or may include only one first unit electrode UE1.

Referring to FIG. 3, a first unit electrode UE1 includes four domains, which are arranged in two rows in the first direction and two columns in the second direction D2, and the four domains are first, second, third, and fourth domains DM1, DM2, DM3, and DM4, which are on the upper left side, the upper right side, the lower left side, and the lower right side, respectively, of the first unit electrode UE1.

A first slit SL1, which is an opening defined along the boundaries between the first through fourth domains DM1 through DM4, is defined in the first unit electrode UE1. The first slit SL1 may be a cross-shaped opening defined in a central part of the first unit electrode UE1, and may control the liquid crystal molecules LC overlapping the pixel electrode PE to have a particular directivity in response to a voltage being applied to the pixel electrode PE.

The width, in the first or second direction D1 or D2, of the first slit SL1 of the first unit electrode UE1 may be smaller than the width, in the first or second direction D1 or D2, of the first unit electrode UE1. The first unit electrode UE1 may also include first connecting patterns CP1, which respectively connect pairs of adjacent domains among the first through fourth domains DM1 through DM4. The first connecting patterns CP1 may be disposed at the ends of the first slit SL1, which extends vertically and horizontally. The first slit SL1 does not divide the first unit electrode UE1 into four completely separate electrodes, and the first through fourth domains DM1 through DM4 may be physically connected to one another. That is, part of the first unit electrode UE1 in the first domain DM1 may be connected to parts of the first unit electrode UE1 in the second and third domains DM2 and DM3, part of the first unit electrode UE1 in the second domain DM2 may be connected to parts of the first unit electrode UE1 in the first and fourth domains DM1 and DM4, part of the first unit electrode UE1 in the third domain DM3 may be connected to parts of the first unit electrode UE1 in the first and fourth domains DM1 and DM4, and part of the first unit electrode UE1 in the fourth domain DM4 may be connected to parts of the first unit electrode UE1 in the second and third domains DM2 and DM3.

Due to the influence of the first slit SL1, the liquid crystal molecules LC overlapping the first domain DM1 may be aligned to be perpendicular to the first base substrate SUB1 in the absence of an electric field between the pixel electrode PE and a common electrode CE, but may be controlled to be tilted in an upper left direction in the presence of an electric field between the pixel electrode PE and the common electrode CE. This is because the common electrode CE is provided as a plate with no particular openings in an area where the first slit SL1 is provided. Similarly, due to the influence of the first slit SL1, the liquid crystal molecules LC overlapping the second domain DM2 may be controlled to be tilted in an upper right direction, the liquid crystal molecules LC overlapping the third domain DM3 may be controlled to be tilted in a lower left direction, and the liquid crystal molecules LC overlapping the fourth domain DM4 may be controlled to be tilted in a lower right direction. Since the liquid crystal molecules are controlled to be tilted in different directions in different domains, the display quality of the LCD device according to the illustrated exemplary embodiment may be made uniform regardless of the angle from which the LCD device according to the illustrated exemplary embodiment is viewed, and the viewing angle of the LCD device according to the illustrated exemplary embodiment may be improved.

The outer sides of the first slit SL1 may extend diagonally with respect to the first or second direction D1 or D2 in an area of the intersection of a portion of the first slit SL1 extending in the first direction D1 and a portion of the first slit SL1 extending in the second direction D2, i.e., in the central part of the first unit electrode UE1 where the first through fourth domains DM1 through DM4 meet. Due to this shape of the first slit SL1, the response speed of the LCD device according to the illustrated exemplary embodiment may be improved.

Referring to FIG. 1, the second unit electrodes UE2 may be physically connected to one another, may receive the same voltage, and may have the same shape. In the illustrated exemplary embodiment, the pixel electrode PE may include a total of six second unit electrodes UE2, which are arranged in a row in the first direction D1. However, the invention is not limited to the illustrated exemplary embodiment. That is, the pixel electrode PE may include more than six second unit electrodes UE2 or may include only one second unit electrode UE2.

Referring to FIGS. 3 and 4, a second unit electrode UE2 may be disposed near the first unit electrode UE1, and the first and second unit electrodes UE1 and UE2 may be physically connected along the boundary therebetween. In response to the first and second unit electrodes UE1 and UE2 being physically connected, misalignment of the liquid crystal molecules LC along, or near, the boundary between the first and second unit electrodes UE1 and UE2 may be minimized due to the interaction between the first and second unit electrodes UE1 and UE2 and openings defined in the common electrode CE, and as a result, the transmittance of the LCD device according to the illustrated exemplary embodiment may be improved. The openings of the common electrode CE will be described later in detail.

The second unit electrode UE2 includes first and sixth domains DM5 and DM6. The fifth and sixth domains DM5 and DM6 divide the second unit electrode UE2 into two halves, and thus both may be disposed adjacent the first unit electrode UE1. A direction in which the liquid crystal molecules LC (refer to FIG. 5) are controlled in the fifth domain DM5 may differ from that of the sixth domain DM6 due to the openings of the common electrode CE.

The second unit electrode UE2 may overlap a gate line GL (refer to FIG. 1). In response to the second unit electrode UE2 overlapping the gate line GL, the boundary between the first and second unit electrodes UE1 and UE2 may be provided along, and near, the gate line GL. Thus, the misalignment of the liquid crystal molecule LC along, and near, the gate line GL may be minimized, and as a result, the transmittance of the LCD device according to the illustrated exemplary embodiment may be improved. This will be described later in further detail.

The opposite substrate OAS will hereinafter be described.

The opposite substrate OAS includes a second base substrate SUB2, an overcoat layer OC, and the common electrode CE.

The opposite substrate OAS includes the second base substrate SUB2. The second base substrate SUB2 may be a transparent insulating substrate. In an exemplary embodiment, the second base substrate SUB2 may be a glass substrate, a quartz substrate, a transparent resin substrate, or the like, for example. The second base substrate SUB2 may include a polymer or plastic material with high thermal resistance. In an exemplary embodiment, the first base substrate SUB1 may be in the shape of a flat plate, for example, but is not limited thereto, and may be curved in a particular direction.

A light-blocking member BM is disposed on the second base substrate SUB2. The light-blocking member BM may overlap the TFT TR, the data line DL (refer to FIG. 1), and the gate line GL, and thus may prevent light leakage that may be caused by misalignment of the liquid crystal molecules LC, or prevent the elements disposed on the first base substrate SUB1 from being visible to the eyes of a user.

A color filter CF is disposed on the light-blocking member BM. The color filter CF may allow the transmission of particular wavelength band components of light incident thereupon from the outside of the first base substrate SUB1 while blocking the transmission of other wavelength band components, and thus may allow light emitted to the outside of the second base substrate SUB2 to be tinged with a particular color.

In an exemplary embodiment, a red color filter, which is a type of the color filter CF that makes a red color visible, transmits light in a wavelength band of about 580 nm to about 780 nm therethrough and absorbs (and/or reflects) light in the other wavelength bands, a green color filter, which is another type of the color filter CF that makes a green color visible, transmits light in a wavelength band of about 450 nm to about 650 nm therethrough and absorbs (and/or reflects) light in the other wavelength bands, and a blue color filter, which is another type of the color filter CF that makes a blue color visible, transmits light in a wavelength band of about 380 nm to about 560 nm therethrough and absorbs (and/or reflects) light in the other wavelength bands, for example. In an exemplary embodiment, the red color filter may include a pigment or a photosensitive organic material rendering a red color, the green color filter may include a pigment or a photosensitive organic material rendering a green color, and the blue color filter may include a pigment or a photosensitive organic material rendering a blue color, for example.

The light-blocking member BM and the color filter CF may not necessarily be disposed on the second base substrate SUB2. That is, in some exemplary embodiments, the light-blocking member BM and the color filter CF may be disposed on the first base substrate SUB1.

The overcoat layer OC is disposed on the light-blocking member BM and the color filter CF. The overcoat layer OC reduces any step differences provided by the light-blocking member BM and the color filter CF. The overcoat layer OC may be optional and may not be provided.

The common electrode CE is disposed on the overcoat layer OC. In an exemplary embodiment, the common electrode CE may include a transparent conductive material such as ITO, IZO, ITZO, AZO, or the like, and may be disposed on the entire surface of the second base substrate SUB2. In response to a particular voltage being applied to the common electrode CE, the common electrode CE may control the liquid crystal molecules LC by generating an electric field with the pixel electrode PE, which is disposed on the first base substrate SUB1 to face the common electrode CE.

The second slits SL2, which are openings defined along the outer sides of the first unit electrode UE1 of the pixel electrode PE that faces the common electrode CE, are defined in the common electrode CE. However, the second slits SL2 may not necessarily be defined along all the outer sides of the first unit electrode UE1, and the common electrode CE may include second connecting patterns CP2, which connect the inside and the outside of the first unit electrode UE1. The second connecting patterns CP2 may overlap the first connecting patterns CP1. Accordingly, all parts of the common electrode CE may be physically connected to one another and may receive the same voltage.

Due to the influence of the second slits SL2, the liquid crystal molecules LC overlapping the first domain DM1 of the pixel electrode PE may be controlled to be tilted in the upper left direction in the presence of an electric field between the pixel electrode PE and the common electrode CE. This may be because the pixel electrode PE is provided as a plate with no particular openings in an area where the second slits SL2 are provided. Similarly, due to the influence of the second slits SL2, the liquid crystal molecules LC overlapping the second domain DM2 of the pixel electrode PE may be controlled to be tilted in the upper right direction, the liquid crystal molecules LC overlapping the third domain DM3 of the pixel electrode PE may be controlled to be tilted in the lower left direction, and the liquid crystal molecules LC overlapping the fourth domain DM4 of the pixel electrode PE may be controlled to be tilted in the lower right direction.

That is, since the first slit SL1 and the second slits SL2 may both control the liquid crystal molecules LC overlapping the first domain DM1 of the pixel electrode PE to be tilted in the same direction, i.e., the upper left direction, misalignment of the liquid crystal molecules LC may be minimized, and as a result, the transmittance of the LCD device according to the illustrated exemplary embodiment may be improved. This directly applies to the liquid crystal molecules LC overlapping each of the second through fourth domains DM2 through DM4.

Third slits SL3, which are openings defined along the outer sides of the second unit electrode UE2 of the pixel electrode PE that faces the common electrode CE, may be defined in the common electrode CE. The third slits SL3 may be defined along the boundary between the first and second unit electrodes UE1 and UE2 and two outer sides of the second unit electrode UE2 adjacent to the boundary between the first and second unit electrodes UE1 and UE2.

However, the third slits SL3 may not be defined to overlap the entire boundary between the first and second unit electrodes UE1 and UE2, and the common electrode CE may also include third connecting patterns CP3, which connect an area corresponding to the first unit electrode UE1 and an area corresponding to the second unit electrode UE2. Accordingly, all parts of the common electrode CE may be physically connected to one another and may receive the same voltage.

Due to the influence of the third slits SL3, the liquid crystal molecules LC overlapping the fifth domain DM5 of the pixel electrode PE may be controlled to be tilted toward the third slit SL3 corresponding to the fifth domain DM5, and the liquid crystal molecules LC overlapping the sixth domain DM6 of the pixel electrode PE may be controlled to be tilted toward the third slit SL3 corresponding to the sixth domain DM6. That is, the liquid crystal molecules LC overlapping the fifth domain DM5 and the liquid crystal molecules LC overlapping the sixth domain DM6 may be controlled to be aligned diagonally with respect to directions in which the first through fourth domains DM1 through DM4 are disposed, and this may be because the pixel electrode PE is provided as a plate with no particular openings in an area where the third slits SL3 are provided.

More specifically, the liquid crystal molecules LC overlapping the fifth domain DM5 of the pixel electrode PE may be controlled to be tilted in the lower left direction because the third slit SL3 corresponding to the fifth domain DM5 is disposed on the lower left side of the fifth domain DM5. Similarly, the liquid crystal molecules LC overlapping the sixth domain DM6 of the pixel electrode PE may be controlled to be tilted in the lower right direction because the third slit SL3 corresponding to the sixth domain DM6 is disposed on the lower right side of the sixth domain DM6.

Accordingly, due to the presence of the third slits SL3, even the liquid crystal molecules LC along the boundary between the first and second unit electrodes UE1 and UE2 of the pixel electrode PE may be controlled to have a particular directivity. Thus, misalignment of the liquid crystal molecules LC may be minimized, and as a result, the transmittance of the LCD device according to the exemplary embodiment may be improved.

As mentioned above, in response to the second unit electrode UE2 overlapping the gate line GL, the boundary between the first and second unit electrodes UE1 and UE2 may be provided along, and near, the gate line GL. Thus, the misalignment of the liquid crystal molecule LC along, and near, the gate line GL may be minimized, and as a result, the transmittance of the LCD device according to the illustrated exemplary embodiment may be improved.

Also, the second unit electrode UE2 may overlap a gate line GL opposite to the gate line GL controlling the pixel having the second unit electrode UE2. That is, the second unit electrode UE2 may overlap not the gate line GL controlling the pixel having the second unit electrode UE2, but another gate line GL. In this case, the improvement of the transmittance of the LCD device according to the illustrated exemplary embodiment by the second unit electrode UE2 may be maximized.

More specifically, it is assumed that two gate lines GL are provided on either side of a pixel, as illustrated in FIG. 1, the pixel is controlled by the lower gate line GL, and a voltage is applied to the upper gate line GL and then to the lower gate line GL. In this case, the second unit electrode UE2 may overlap the upper gate line GL, which does not control the pixel. A voltage is applied to the upper gate line GL first and then to the lower gate line GL, and in response to a voltage being provided to the lower gate line GL, a voltage may also be applied to the second unit electrode UE2. Since an operation of the upper gate line GL is already complete at the time of providing a voltage to the second unit electrode UE2, the second unit electrode UE2 is not affected by the influence of the upper gate line GL, and thus, the improvement of the transmittance of the LCD device according to the illustrated exemplary embodiment by the second unit electrode UE2 may be maximized.

The liquid crystal layer LCL will hereinafter be described.

The liquid crystal layer LCL includes the liquid crystal molecules LC, which have dielectric anisotropy. In an exemplary embodiment, the liquid crystal molecules LC may be vertical alignment ("VA")-type liquid crystal molecules LC aligned between the array substrate AS and the opposite substrate OAS in a vertical direction with respect to both the array substrate AS and the opposite substrate OAS. In response to an electric field being applied between the array substrate AS and the opposite substrate OAS, the liquid crystal molecules LC may be tilted with a particular slope between the array substrate AS and the opposite substrate OAS according to the intensity of the electric field, and thus may either allow or block the transmission of light.

A direction in which to control the liquid crystal molecules LC in each domain will hereinafter be described with reference to FIG. 5.

Figure 5:
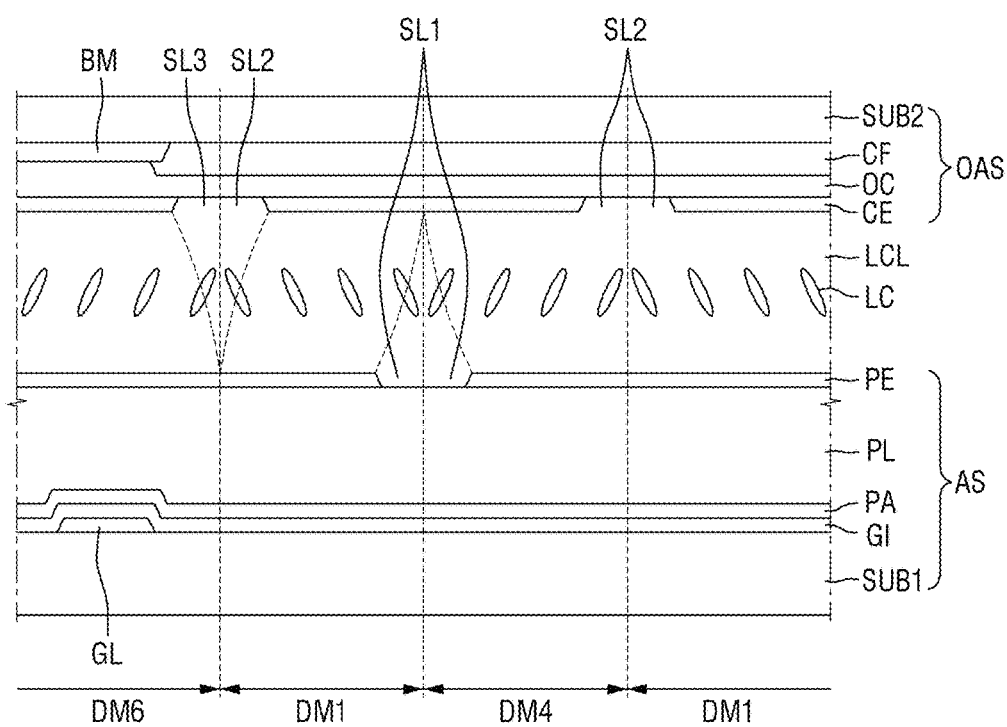
FIG. 5 is a cross-sectional view taken along line II-IF of FIG. 1.

FIG. 5 is a cross-sectional view taken along line II-IF of FIG. 1.

Referring to FIG. 5, a direction in which the liquid crystal molecules LC are tilted may differ from one side to the other side of each of the boundaries between the first through sixth domains DM1 through DM6.

More specifically, the liquid crystal molecules LC in the sixth domain DM6 may be controlled to be tilted to the right. The liquid crystal molecules LC in the first domain DM1, which is adjacent to the sixth domain DM6, may be controlled to be tilted to the left. The liquid crystal molecules LC in the fourth domain DM4, which is adjacent to the first domain DM1 may be controlled to be tilted to the right.

The gate line GL is disposed in the sixth domain DM6. In this case, the pixel electrode PE is disposed between the gate line GL and the liquid crystal molecules LC. Since no particular openings are defined in part of the pixel electrode PE overlapping the gate electrode GL, the influence of a voltage applied to the gate line GL on the liquid crystal molecules LC near the gate line GL may be minimized because the liquid crystal layer LCL may be effectively prevented from being affected by any unexpected electric field generated by the pixel electrode PE under the influence of the gate line GL.

Since the third slits SL3 are defined near part of the common electrode CE overlapping the gate line GL, the force of control over the liquid crystal molecules LC may be maintained. As a result, misalignment of the liquid crystal molecules LC may be minimized, and the transmittance of the LCD device according to the illustrated exemplary embodiment may be improved. Due to the presence of the light-blocking member BM overlapping the gate line GL, the transmission of light may be blocked, but the effects of minimizing misalignment of the liquid crystal molecules LC and improving the transmittance of the LCD device according to the illustrated exemplary embodiment may still be provided. This will hereinafter be described in detail with reference to FIG. 6.

Figure 6:
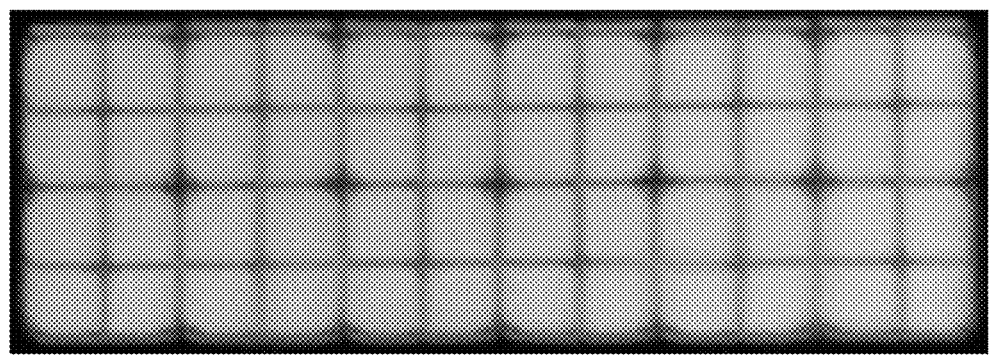
FIG. 6 is a photograph showing an exemplary embodiment of an emission of light from the exemplary embodiment of a pixel of the LCD device of FIG. 1.

FIG. 6 is a photograph showing the emission of light from a pixel of the LCD device according to the exemplary embodiment of FIG. 1.

Referring to FIG. 6, dark areas along the sides of the photograph represent areas in which the light-blocking member BM is provided, and dark lines that appear between bright areas at the top of the photograph represent areas where the third slits SL3 are provided.

No particular dark spots that may be generated due to misalignment of the liquid crystal molecules LC, except for those generated by the third slits SL3, are detected from the areas where the third slits SL3 are provided. That is, even though the light-blocking member BM is provided in the areas where the third slits SL3 are provided, no particular dark spots are detected from the areas where the third slits SL3 are provided. This means an improvement in the transmittance of the LCD device according to the exemplary embodiment of FIG. 1.

Figure 7:
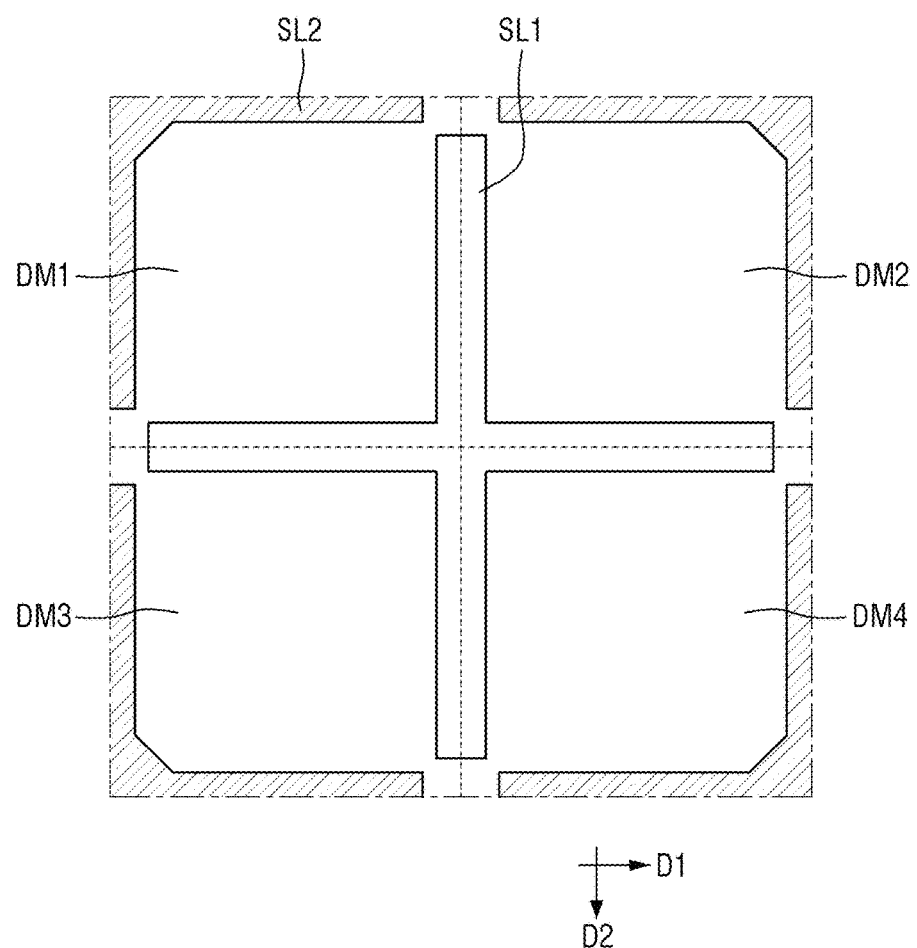
FIG. 7 is an enlarged plan view of another exemplary embodiment of a first unit electrode of an LCD device according to the invention.
Figure 8:
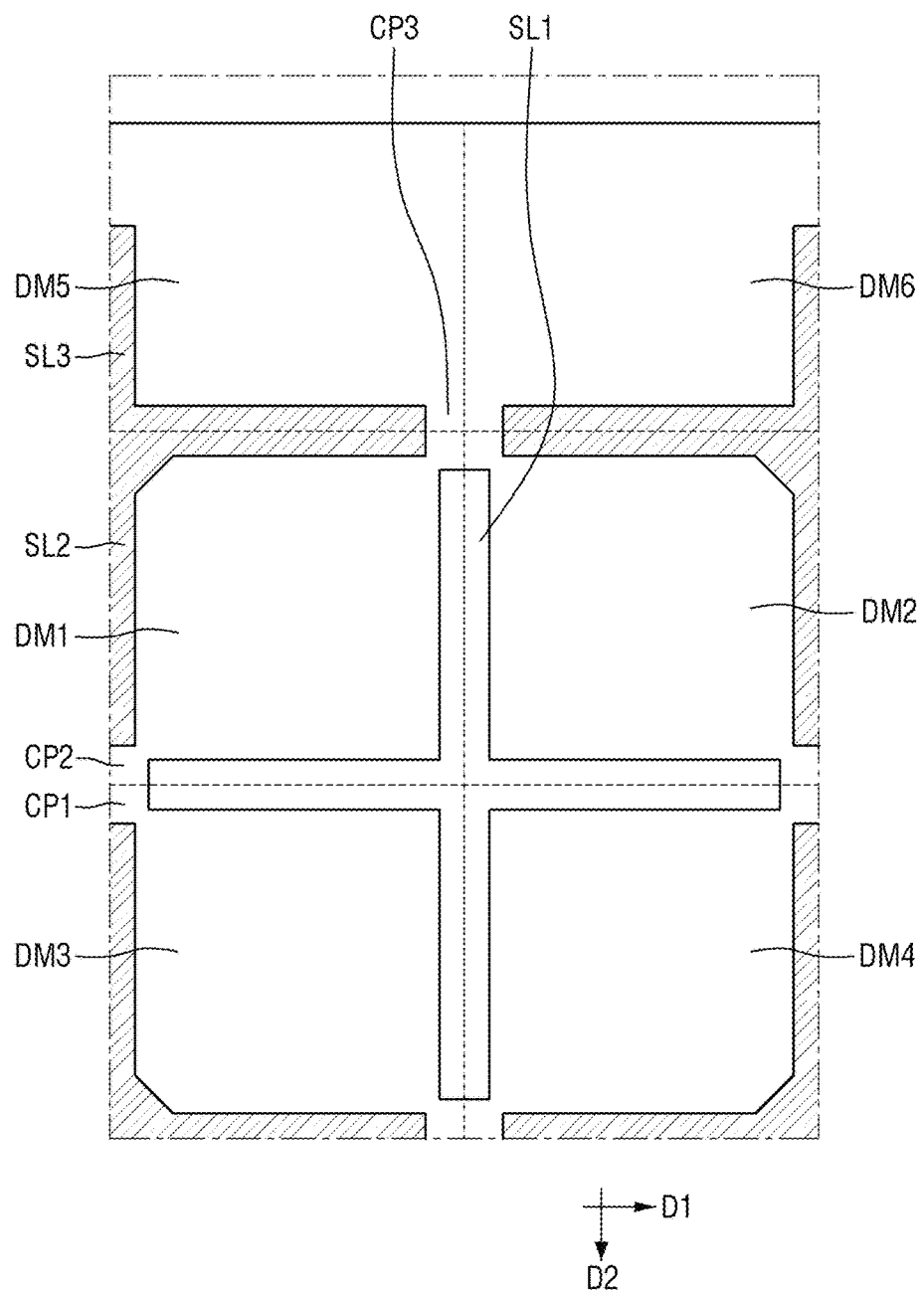
FIG. 8 is an enlarged plan view of another exemplary embodiment of a first unit electrode of an LCD device according to the invention.

FIG. 7 is an enlarged plan view of a first unit electrode of an LCD device according to another exemplary embodiment of the invention, and FIG. 8 is an enlarged plan view of a first unit electrode and a second unit electrode of the LCD device according to the exemplary embodiment of FIG. 7.

In the above-described exemplary embodiments and exemplary embodiments of FIGS. 7 and 8, like reference numerals represent like elements, and thus, detailed or redundant descriptions thereof will be omitted.

Referring to FIGS. 7 and 8, the outer sides of a first slit SL1 may extend straight in a first direction D1 or a second direction D2 in an area of the intersection of a portion of the first slit SL1 extending in the first direction D1 and a portion of the first slit SL1 extending in the second direction D2, i.e., in a central part of a first unit electrode UE1 where first through fourth domains DM1 through DM4 meet. That is, the outer sides of the first slit SL1 of FIGS. 3 and 4 extend diagonally with respect to the first or second direction D1 and D2 in the area of the intersection of the portion of the first slit SL1 extending in the first direction D1 and the portion of the first slit SL1 extending in the second direction D2, but the outer sides of the first slit SL1 of FIGS. 7 and 8 may continue to extend straight in the first or second direction D1 or D2.

Accordingly, the area of a pixel electrode PE within a pixel may increase, and as a result, the transmittance of the LCD device according to the illustrated exemplary embodiment may be improved.

A second unit electrode UE2 may have no opening patterns in the pixel electrode PE, and thus may have the same shape as the second unit electrode UE2 of FIG. 4.

Figure 9:
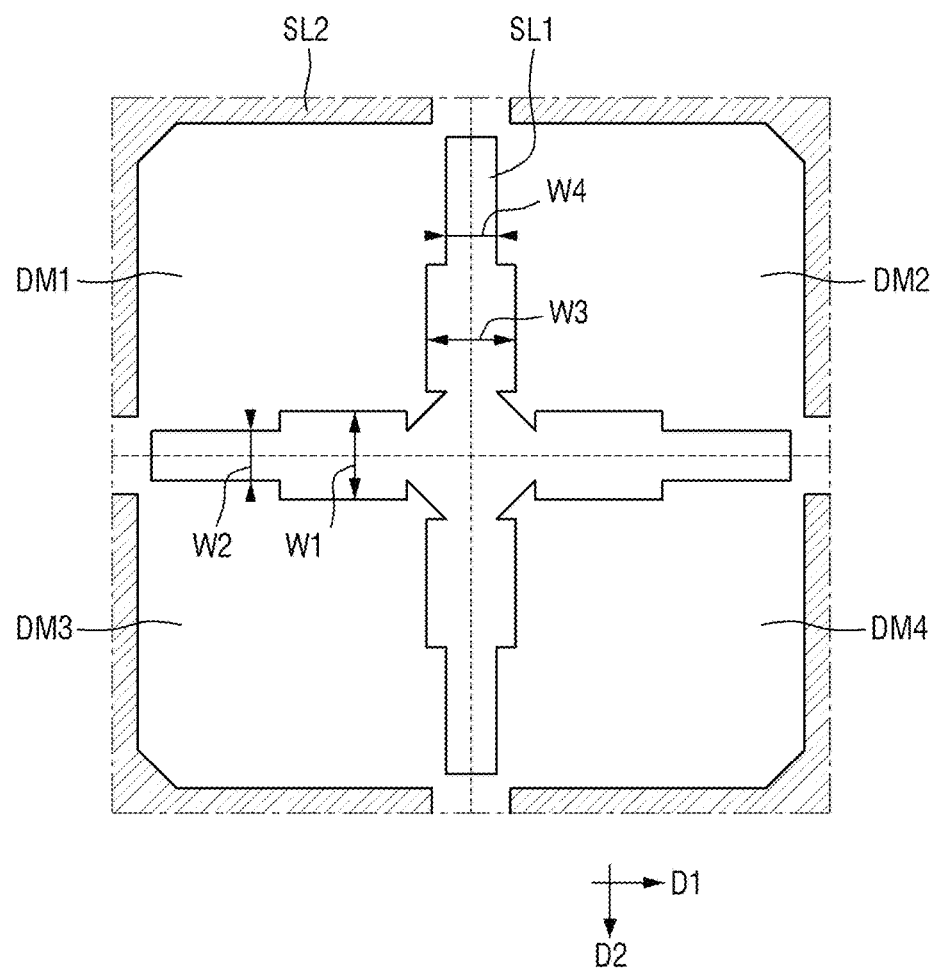
FIG. 9 is an enlarged plan view of another exemplary embodiment of a first unit electrode of the LCD device according to the invention.
Figure 10:
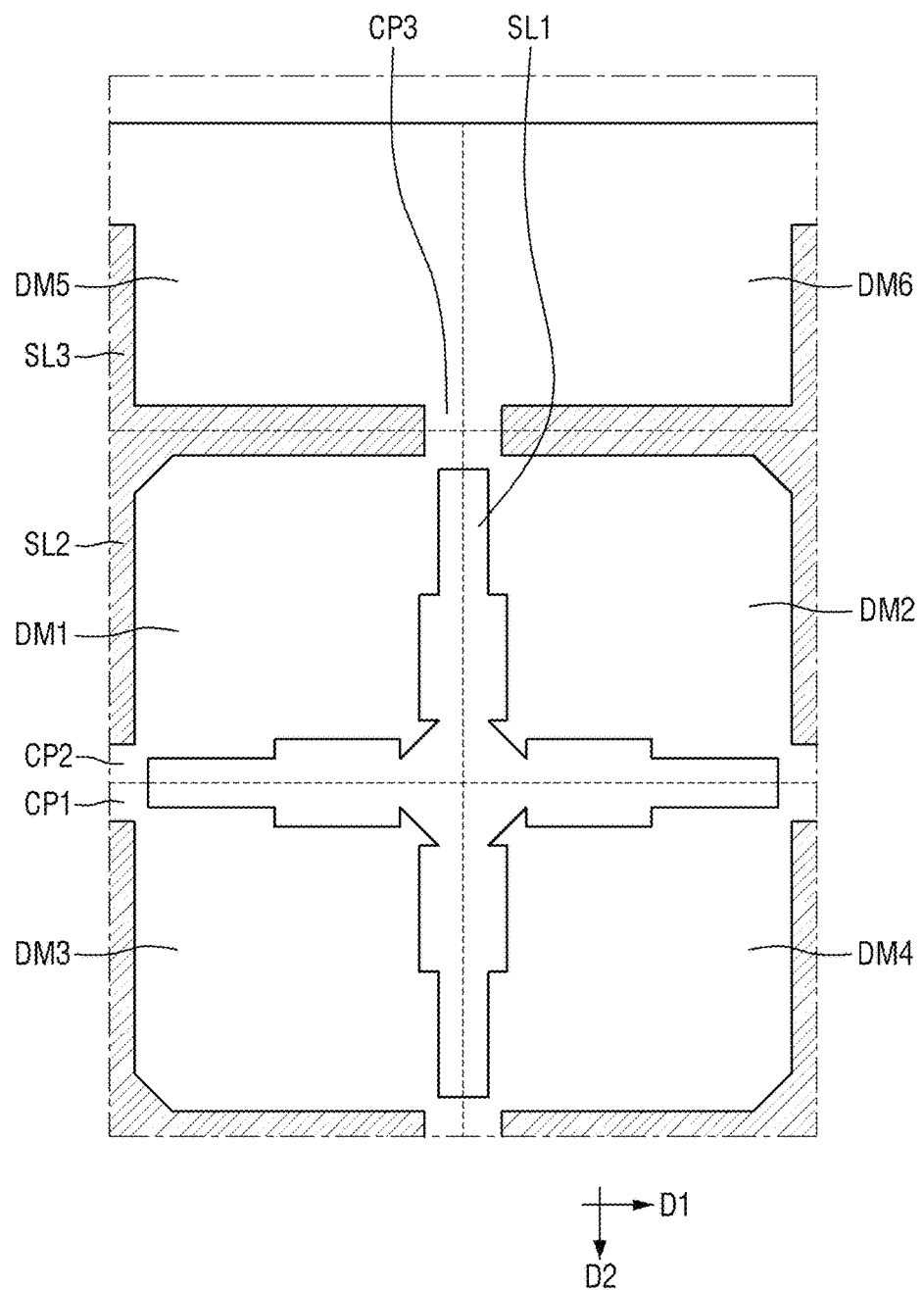
FIG. 10 is an enlarged plan view of a first unit electrode and a second unit electrode of the exemplary embodiment of an LCD device FIG. 9.

FIG. 9 is an enlarged plan view of a first unit electrode of an LCD device according to another exemplary embodiment of the invention, and FIG. 10 is an enlarged plan view of a first unit electrode and a second unit electrode of the LCD device according to the exemplary embodiment of FIG. 9.

Referring to FIGS. 9 and 10, portions of a first slit SL1 extending in a first direction D1, i.e., a portion of the first slit SL1 adjoining first and third domains DM1 and DM3 and a portion of the first slit SL1 adjoining second and fourth domains DM2 and DM4, may have two different widths. Also, portions of a first slit SL1 extending in a second direction D2, i.e., a portion of the first slit SL1 adjoining the first and second domains DM1 and DM2 and a portion of the first slit SL1 adjoining the third and fourth domains DM3 and DM4, may have two different widths.

More specifically, the portions of the first slit SL1 extending in the first direction D1 may have a first width W1 in an area of the intersection with the portions of the first slit SL1 extending in the second direction D2, i.e., in a central part of a first unit electrode UE1 where the first through fourth domains DM1 through DM4 meet, and may have a second width W2 elsewhere. The first width W1 may be greater than the second width W2.

Similarly, the portions of the first slit SL1 extending in the second direction D2 may have a third width W3 in the area of the intersection with the portions of the first slit SL1 extending in the first direction D1 and may have a fourth width W4 elsewhere. The third width W3 may be greater than the fourth width W4.

By defining the first slit SL1 to have multiple widths in different areas, the response speed of the LCD device according to the illustrated exemplary embodiment may be further improved, compared to an LCD device having the first slit SL1 of FIGS. 3 and 4.

A second unit electrode UE2 may have no opening patterns in a pixel electrode PE, and thus may have the same shape as the second unit electrode UE2 of FIG. 4.

Figure 11:
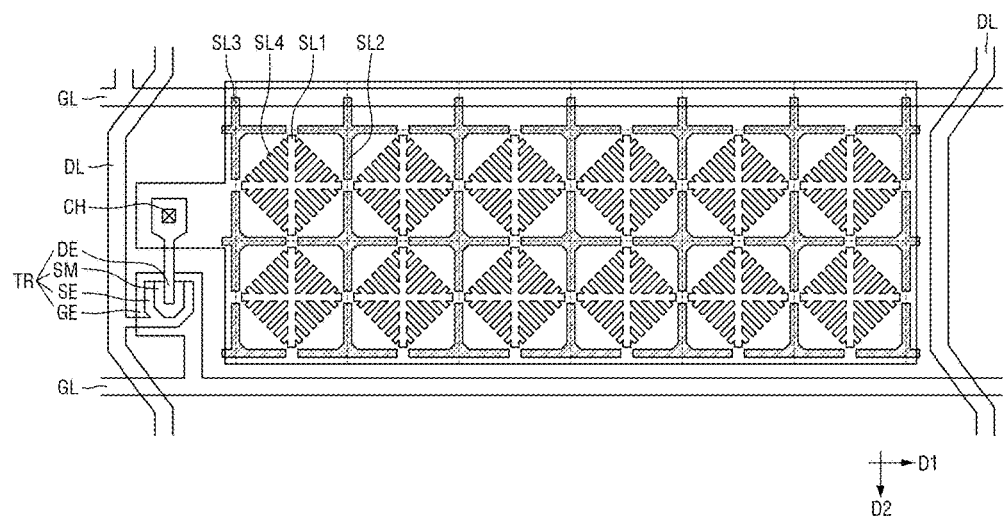
FIG. 11 is a plan view of another exemplary embodiment of a pixel of an LCD device according to the invention.
Figure 12:
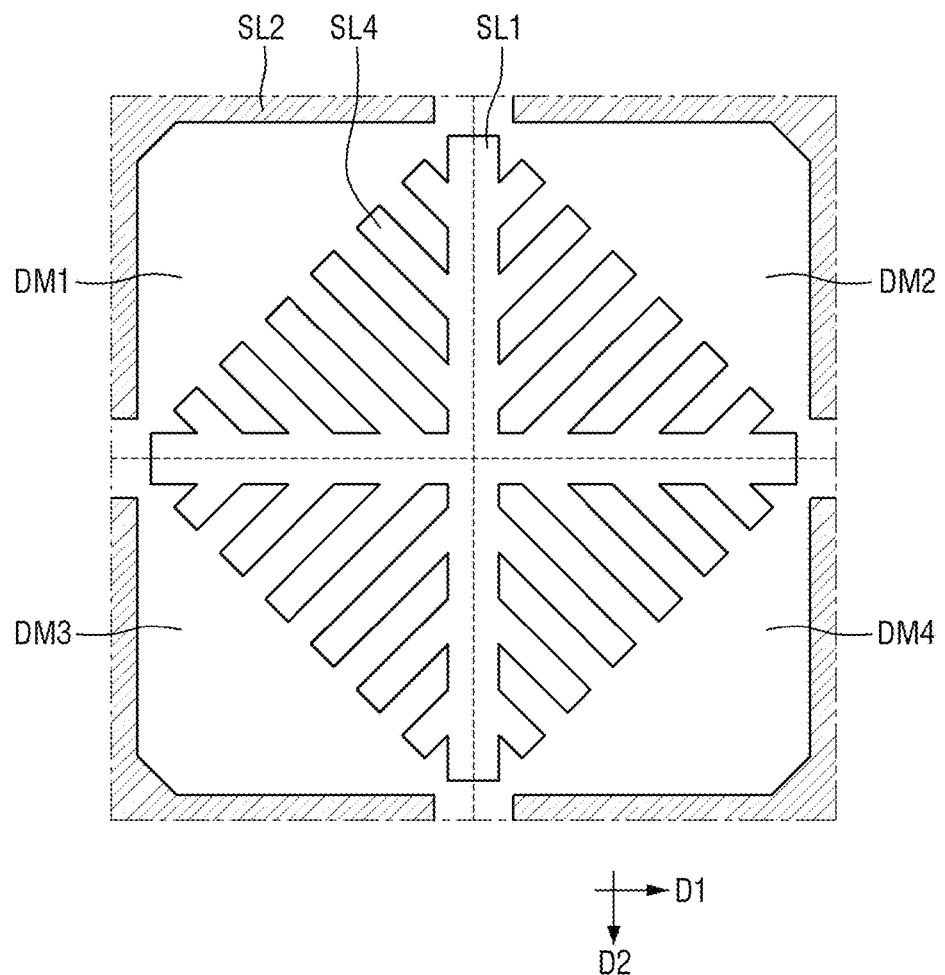
FIG. 12 is an enlarged plan view of an exemplary embodiment of a first unit electrode of the exemplary embodiment of the LCD device of FIG. 11.
Figure 13:
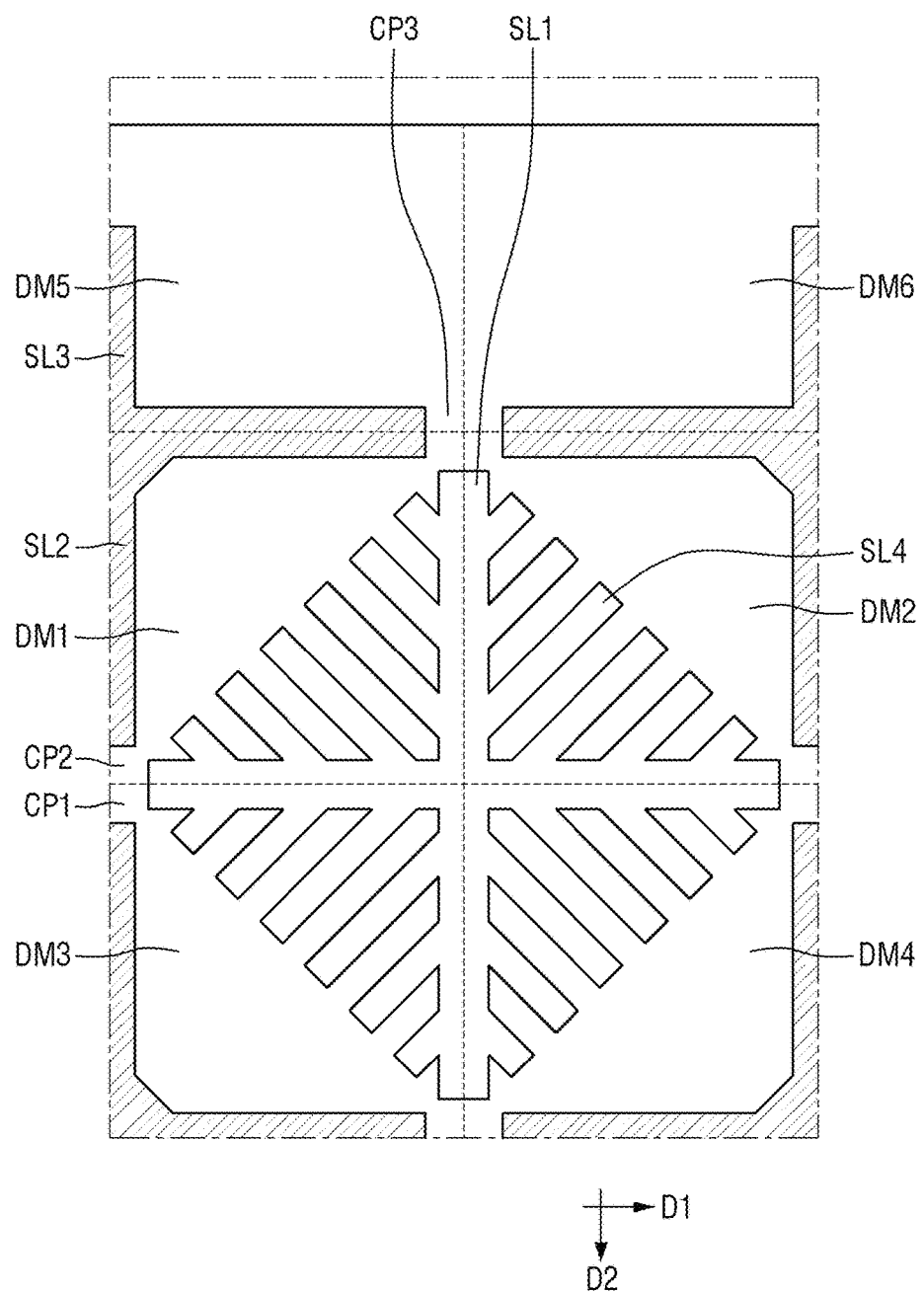
FIG. 13 is an enlarged plan view of an exemplary embodiment of a first unit electrode and a second unit electrode of the exemplary embodiment of the LCD device of FIG. 11.

FIG. 11 is a plan view of a pixel of an LCD device according to another exemplary embodiment of the invention, FIG. 12 is an enlarged plan view of a first unit electrode of the LCD device according to the exemplary embodiment of FIG. 11, and FIG. 13 is an enlarged plan view of a first unit electrode and a second unit electrode of the LCD device according to the exemplary embodiment of FIG. 11.

Referring to FIGS. 11 through 13, a first unit electrode UE1 includes a plurality of fourth slits SL4, which are openings extending from a first slit SL1 diagonally with respect to a first direction D1 or a second direction D2. The fourth slits SL4 extend from the first slit SL1 in different lengths. The fourth slits SL4 may extend to a line connecting every two diagonally opposite corners of the first slit SL1, and as a result, lines connecting the ends of the fourth slits SL4 may have a rhombus shape, for example.

In response to the first unit electrode UE1 further including the fourth slits SL4, the area of a patterned part of the first unit electrode UE1 relative to the entire area of the first unit electrode UE1 may increase. Accordingly, the response speed of the LCD device according to the illustrated exemplary embodiment may be further improved, compared to an LCD device having the first slit SL1 of FIGS. 3 and 4.

A second unit electrode UE2 may have no opening patterns in a pixel electrode PE, and thus may have the same shape as the second unit electrode UE2 of FIG. 4.

What is claimed is:

1. A liquid crystal display device comprising:
   a first substrate and a second substrate facing the first substrate;
   a first gate line and a second gate line disposed on the first substrate, the first gate line and the second gate line extending in a first direction;
   a data line disposed on the first substrate and extending in a second direction crossing the first direction, the data line insulated from the first gate line and the second gate line;
   a thin film transistor disposed on the disposed on the first substrate, the thin film transistor connected to the second gate line and the data line;
   a pixel electrode disposed on the first substrate and connected to the thin film transistor; and
   a common electrode disposed on the second substrate;
   wherein a width of the pixel electrode in the first direction is wider than a width of the pixel electrode in the second direction,
   wherein the pixel electrode includes a plurality of first unit electrodes, and a plurality of second unit electrodes,
   each of the plurality of first unit electrodes includes four domains, which are arranged in two rows in a first direction and two columns in a second direction which intersects the first direction, the four domains include first, second, third, and fourth domains, which are on an upper left side, an upper right side, a lower left side, and a lower right side, respectively, of a corresponding first unit electrode,
   each of the plurality of second unit electrodes does not include an opening,
   a first slit, which is an opening defined along boundaries between the first through fourth domains, is defined in each of the plurality of first unit electrodes,
   second slits, which are openings defined along outer sides of each of the first unit electrodes, are defined in the common electrode, and
   the plurality of second unit electrodes overlaps the first gate line opposite to the second gate line,
   the plurality of second unit electrodes fully cover the first gate line along the second direction in a plan view, and
   the plurality of first unit electrodes are disposed between the first gate line and the second gate line.

2. The liquid crystal display device of claim 1, wherein each of the plurality of second unit electrodes includes fifth and sixth domains, which are arranged in a row in the first direction or in the second direction.

3. The liquid crystal display device of claim 2, wherein third slits, which are openings defined along each of boundaries between the plurality of first unit electrodes and the plurality of second unit electrodes and two outer sides of each of the plurality of second unit electrodes adjacent to each of the boundaries between the plurality of first unit electrodes and the second unit electrodes, are defined in the common electrode.

4. The liquid crystal display device of claim 2, wherein each of the plurality of first unit electrodes further includes first connecting patterns, which respectively connect pairs of adjacent domains among the first through fourth domains.

5. The liquid crystal display device of claim 1, wherein outer sides of the first slit extend diagonally with respect to the first or second direction in a central part of the corresponding first unit electrode where the first through fourth domains meet.

6. The liquid crystal display device of claim 1, wherein outer sides of the first slit extend straight in the first or second direction in a central part of each of the corresponding first unit electrode where the first through fourth domains meet.

7. The liquid crystal display device of claim 1, wherein the first slit has a first width or a second width along the boundary between the first and third domains or between the second and fourth domains and has a third width or a fourth width along the boundary between the first and second domains or between the third and fourth domains.

8. The liquid crystal display device of claim 7, wherein the first slit has the first width or the second width in the central part of the corresponding first unit electrode where the first through fourth domains meet and has the third width or the fourth width elsewhere, the first width is greater than the second width, and the third width is greater than the fourth width.

9. The liquid crystal display device of claim 1, wherein a plurality of fourth slits, which are openings extending from the first slit diagonally with respect to the first direction or the second direction, is defined in each of the plurality of first unit electrodes.

10. A liquid crystal display device comprising:
a first substrate and a second substrate facing the first substrate;
a first gate line and a second gate line disposed on the first substrate, the first gate line and the second gate line extending in a first direction;
a data line disposed on the first substrate and extending in a second direction crossing the first direction, the data line insulated from the first gate line and the second gate line;
a thin film transistor disposed on the disposed on the first substrate, the thin film transistor connected to the second gate line and the data line;
a pixel electrode disposed on the first substrate and connected to the thin film transistor; and
a common electrode disposed on the second substrate;
wherein a width of the pixel electrode in the first direction is wider than a width of the pixel electrode in the second direction,
wherein the pixel electrode includes a plurality of first unit electrodes and a plurality of second unit electrodes,
each of the plurality of first unit electrodes includes four domains which are arranged in two rows in a first direction and two columns in a second direction which intersects the first direction,
each of the plurality of second unit electrodes does not include an opening,
the four domains include first, second, third, and fourth domains, which are on an upper left side, an upper right side, a lower left side, and a lower right side, respectively, of a corresponding first unit electrode,
liquid crystal molecules overlapping the first domain are controlled to be tilted in an upper left direction,
liquid crystal molecules overlapping the second domain are controlled to be tilted in an upper right direction,
liquid crystal molecules overlapping the third domain are controlled to be tilted in a lower left direction,
liquid crystal molecules overlapping the first domain are controlled to be tilted in a lower right direction, and
the plurality of second unit electrodes overlaps the first gate line opposite to the second gate line,
the plurality of second unit electrodes fully cover the first gate line along the second direction in a plan view, and
the plurality of first unit electrodes are disposed between the first gate line and the second gate line.

11. The liquid crystal display device of claim 10, wherein each of the plurality of second unit electrodes includes fifth and sixth domains, which are arranged in a row in the first direction or in the second direction.

12. The liquid crystal display device of claim 11, wherein liquid crystal molecules overlapping the fifth and sixth domains are controlled to be tilted diagonally with respect to directions in which the first through fourth domains are disposed.

13. The liquid crystal display device of claim 12, wherein the liquid crystal molecules overlapping the fifth domain and the liquid crystal molecules overlapping the sixth domain are controlled to be tilted in different directions.

14. The liquid crystal display device of claim 10, wherein a first slit, which is an opening defined along boundaries between the first through fourth domains, is defined in each of the plurality of first unit electrodes, and second slits, which are openings defined along outer sides of each of the plurality of first unit electrodes, are defined in the common electrode.

15. The liquid crystal display device of claim 14, wherein third slits, which are openings defined along each of boundaries between the plurality of first unit electrodes and the plurality of second unit electrodes and two outer sides of each of the plurality of second unit electrodes adjacent to each of the boundaries between the plurality of first unit electrodes and the plurality of second unit electrodes, are defined in the common electrode.

16. The liquid crystal display device of claim 14, wherein each of the plurality of first unit electrodes further includes first connecting patterns, which respectively connect pairs of adjacent domains among the first through fourth domains.

* * * * *